(12) United States Patent
Halligan et al.

(10) Patent No.: US 7,640,408 B1
(45) Date of Patent: Dec. 29, 2009

(54) ONLINE DATA MIGRATION

(75) Inventors: Kenneth A. Halligan, Leominster, MA (US); Arieh Don, Newton, MA (US); Michael Scharland, Franklin, MA (US); David Joshua Brown, Chelmsford, MA (US); Patrick Brian Riordan, Watertown, MA (US)

(73) Assignee: EMC Corporation, Hopkinton, MA (US)

( * ) Notice: Subject to any disclaimer, the term of this patent is extended or adjusted under 35 U.S.C. 154(b) by 868 days.

(21) Appl. No.: 10/879,383

(22) Filed: Jun. 29, 2004

(51) Int. Cl.
*G06F 12/00* (2006.01)
(52) U.S. Cl. ...................................... 711/162
(58) Field of Classification Search ........................ None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,415,296 B1 * | 7/2002 | Challener et al. | 707/200 |
| 6,473,775 B1 * | 10/2002 | Kusters et al. | 707/200 |
| 6,549,992 B1 * | 4/2003 | Armangau et al. | 711/162 |
| 6,611,901 B1 * | 8/2003 | Micka et al. | 711/162 |
| 7,120,673 B2 * | 10/2006 | Kitamura et al. | 709/213 |
| 7,343,449 B2 * | 3/2008 | Arai et al. | 711/113 |
| 2004/0186900 A1 * | 9/2004 | Nakano et al. | 709/213 |
| 2005/0177693 A1 * | 8/2005 | Nahum | 711/162 |
| 2005/0278391 A1 * | 12/2005 | Spear et al. | 707/201 |

* cited by examiner

*Primary Examiner*—Brian R Peugh
(74) *Attorney, Agent, or Firm*—Muirhead and Saturnelli, LLC

(57) ABSTRACT

Described are techniques for use with online data copying or migration. Data is pushed from a source to a target device while one or both of the source and target devices are available for use by one or more host systems. The host systems may perform I/O operations to the source and/or target devices while the data migration is ongoing if a copy session is defined on the data storage system(s) of the source and/or target devices. A copying operation performs data migration from the source to the target device. A migration vector is used to indicate which portions of the source have been migrated. A change vector may be associated with each of the source and/or target devices to indicate portions that have been modified in order to perform a differential copy operation.

20 Claims, 19 Drawing Sheets

| Track No. | Migrate |
|---|---|
| 1 | 1 |
| 2 | 1 |
| 3 | 1 |
| .. | .. |
| .. | .. |
| N-1 | 1 |
| N | 1 |

FIGURE 4

ONLINE DATA MIGRATION

BACKGROUND

1. Technical Field

This application generally relates to a data storage system, and more particularly to techniques used with copying data.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845, 147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with data stored on one or more data storage systems. A copy of data from a data storage device to another device may be made, for example, as part of a data backup procedure. Data may also be restored from a first device to a second device in which the first device includes a previously made point in time copy of data from the second device. Such data restoration may be performed, for example, if the data on the first device has become corrupted. Making a copy of data from a device, or restoring data from one device to another may be performed offline (without host access to the device). However, it may be desirable to perform such operations while one or more of the associated devices to which data is being restored, or from which data is being copied, are online (with host access to the device) and available for use by one or more host systems connected thereto.

SUMMARY OF THE INVENTION

In accordance with one aspect of the invention is a method for copying data from a source device to a target device comprising: performing a copy operation copying data from said source device to said target device; if a read or write operation is performed to the target device prior to a first data portion associated with said read or said write operation being copied to said target device, copying said first data portion to said target device and performing said read or said write operation; and if a write operation is performed to the source device prior to a second data portion associated with said write operation being copied to said target device, copying said second data portion to said target device and performing said write operation to said source device. The copy operation, said copying said first data portion, and said copying said second portion, may update a migration bitmap having one or more entries in which each entry is associated with a portion of said target device. Each of said entries in said migration bitmap may be associated with a track of data. Each of said entries may have a value of 0 when a track of data associated with said each entry has been migrated, and a value of 1 otherwise. The method may also include initializing each entry in said migration bitmap to 1, and wherein each of said copy operation, said copying said first data portion and said copying said second portion may modify an entry in said migration bitmap to 0 after a corresponding track of data has been migrated from said source device to said target device. A first host may issue a data request to a first data storage system including said source device and a second host may issue a data request to a second data storage system including said target device, said first data storage system being remote with respect to said second data storage system. The copy operation may be performed by code executing on either said first or said second data storage system in accordance with which of said data storage systems is controlling a data migration from said source device to said target device. The method may also include updating one or more entries in a change bitmap associated with one of said source device or said target device indicating one or more modified portions of said one device in accordance with a request for performing a write operation for said one device. Each entry in said change bitmap may be associated with a track of data on said one device, said each entry in said change bitmap having a value of 1 if a corresponding track of data on said one device has been modified and a value of zero otherwise. The method may also include performing an incremental backup of said source device to said target device using said change bitmap as a migration bitmap indicating which tracks of data to copy from said source device to said target device, wherein each track of said source device having a corresponding entry of 1 in said migration bitmap is copied from said source device to said target device.

In accordance with another aspect of the invention is a computer program product for copying data from a source device to a target device comprising code that: performs a copy operation copying data from said source device to said target device; if a read or write operation is performed to the target device prior to a first data portion associated with said read or said write operation being copied to said target device, copies said first data portion to said target device and performing said read or said write operation; and if a write operation is performed to the source device prior to a second data portion associated with said write operation being copied to said target device, copies said second data portion to said target device and performing said write operation to said source device. The copy operation, said code that copies said first data portion, and said code that copies said second portion, may update a migration bitmap may have one or more entries in which each entry is associated with a portion of said target device. Each of said entries in said migration bitmap may be associated with a track of data. Each of said entries may have a value of 0 when a track of data associated with said each entry has been migrated, and a value of 1 otherwise.

The computer program product may also include code that initializes each entry in said migration bitmap to 1, and wherein each of said copy operation, said copying said first data portion and said copying said second portion may modify an entry in said migration bitmap to 0 after a corresponding track of data has been migrated from said source device to said target device. A first host may issue a data request to a first data storage system including said source device and a second host may issue a data request to a second data storage system including said target device, said first data storage system being remote with respect to said second data storage system. The copy operation may be performed by code executing on either said first or said second data storage system in accordance with which of said data storage systems is controlling a data migration from said source device to said target device. The computer program product may also include code that updates one or more entries in a change bitmap associated with one of said source device or said target device indicating one or more modified portions of said one device in accordance with a request for performing a write operation for said one device. Each entry in said change bitmap may be associated with a track of data on said one device, said each entry in said change bitmap having a value of 1 if a corresponding track of data on said one device has been modified and a value of zero otherwise. The computer program product may also include code that performs an incremental backup of said source device to said target device using said change bitmap as a migration bitmap indicating which tracks of data to copy from said source device to said target device, wherein each track of said source device having a corresponding entry of 1 in said migration bitmap is copied from said source device to said target device.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of an embodiment of a migration bitmap;

DETAILED DESCRIPTION OF EMBODIMENT(S)

Figure 1:
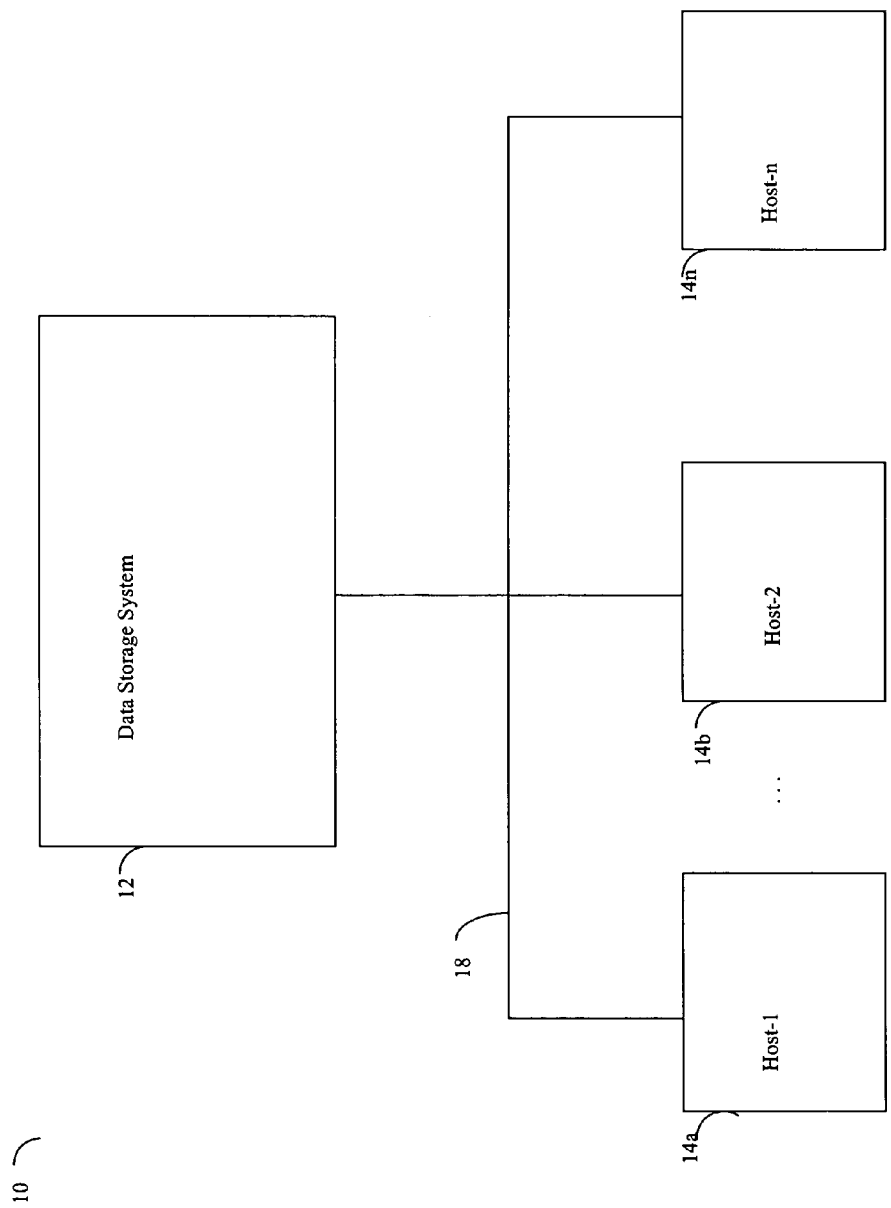
FIG. 1 is an example of an embodiment of a computer system according to the present invention.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or iSCSI, and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
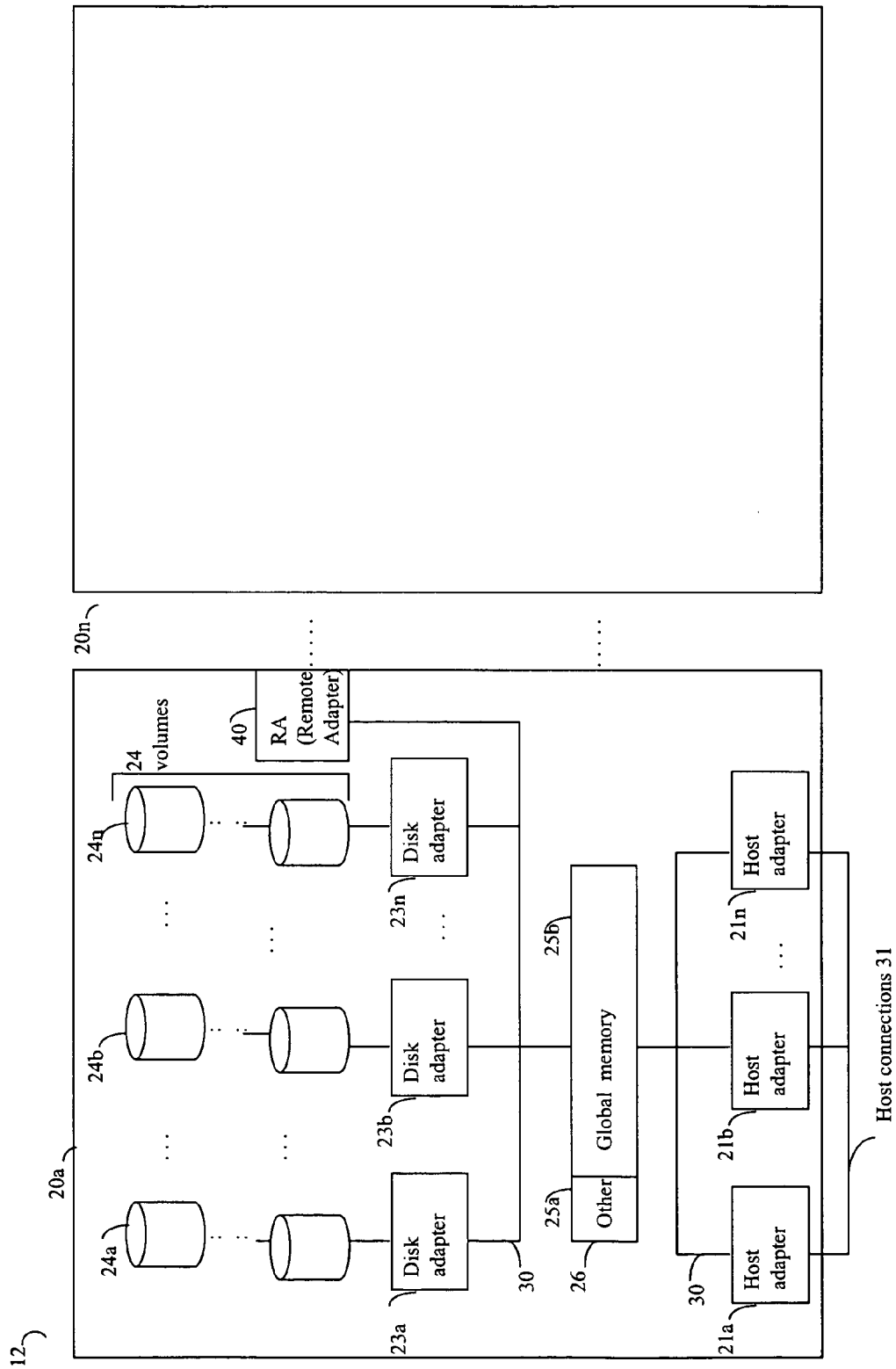
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
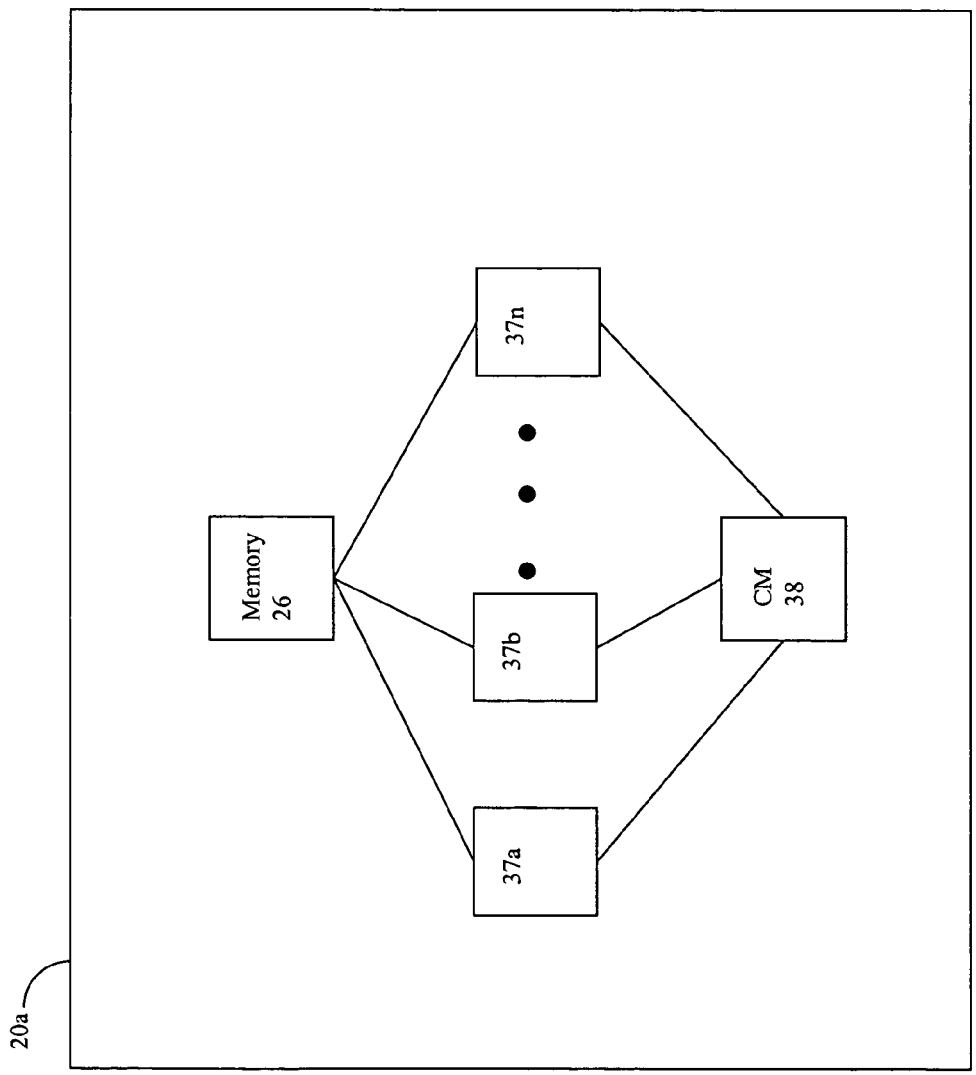
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 54 so that any one of the directors 37a-37n may send a message and/or data to any other one of the directors 37a-37n without needing to go through the memory 26. The CM 54 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
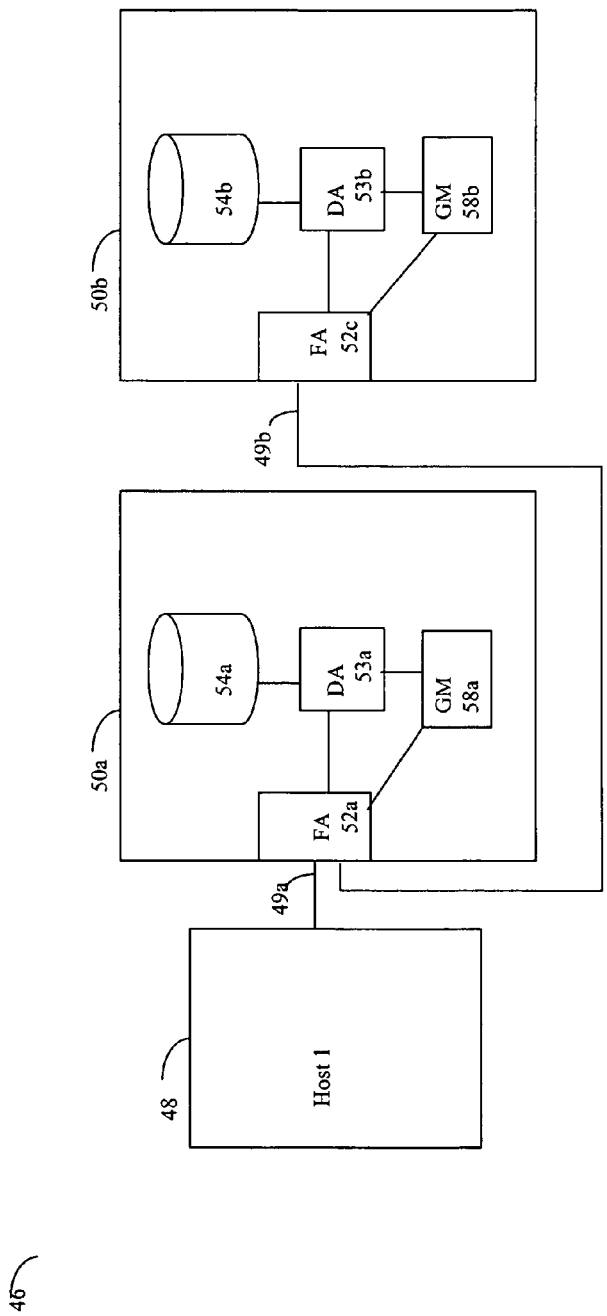
FIG. 3 is a simplified illustration of an example of an embodiment of the computer system of FIGS. 1 and 2.

Referring now to FIG. 3, shown is an example of an embodiment of a computer system 46 illustrating the relationship between a host 48 and a first data storage system 50a, and a second data storage system 50b. It should be noted that the embodiment illustrated in FIG. 3 is a simplified view of components of a computer system, for example, including only some detail of the data storage systems 50a and 50b for the sake of illustration. In this example, the HA may be a Fibre Channel Adapter (FA) 52a. The host 48 may issue a command to data storage system 50a over connection 49a to the FA 52a. The data storage system 50a may communicate with data storage system 50b over connection 49b using FA 52a and FA 52c. Data may be copied from data storage system 50a to 50b over connection 49b.

A command may be issued from the host 1 48, other system connected to the data storage systems (not shown), or from a task executing within the data storage system, to create a point in time copy of the data from device 54a to remote device 54b. This command may cause a copy task to execute within the data storage system 50a to copy the data to system 50b while the devices, such as 54a, are accessible on line to the host system 48. In other words, a point in time copy of 54a is made to 54b. While this copy of 54a is being made, the host 48 may also perform data operations, such as data reads and writes, to the device 54a. In one embodiment, with reference to FIG. 3, the Fibre Channel adapter 52a may execute code to perform the copying of data from 54a to 54b. Data may be copied from 54a by DA 53a to GM (Global Memory) 58a. Data from GM 58a may then be communicated to FA52a which sends data to FA 52c. FA52c then places the data in GM 58b. DA 53b may then transfer the data from GM 58b to the device 54b. The foregoing copying in connection with creating a point in time copy of device 54a on device 54b may be performed while the device 54a is online and available for use by host 1 48, such as in connection with performing read and/or write operations. What will now be described are techniques that may be used in connection with performing the online data migration or copying of device 54a.

If the host 48 performs a write operation to device 54a, the write operation to a portion of device 54 may not be performed until the data included in the portion of device 54a is first copied to the remote device 54b. In order to facilitate this online data migration, an embodiment may use a migration bitmap.

Figure 4:
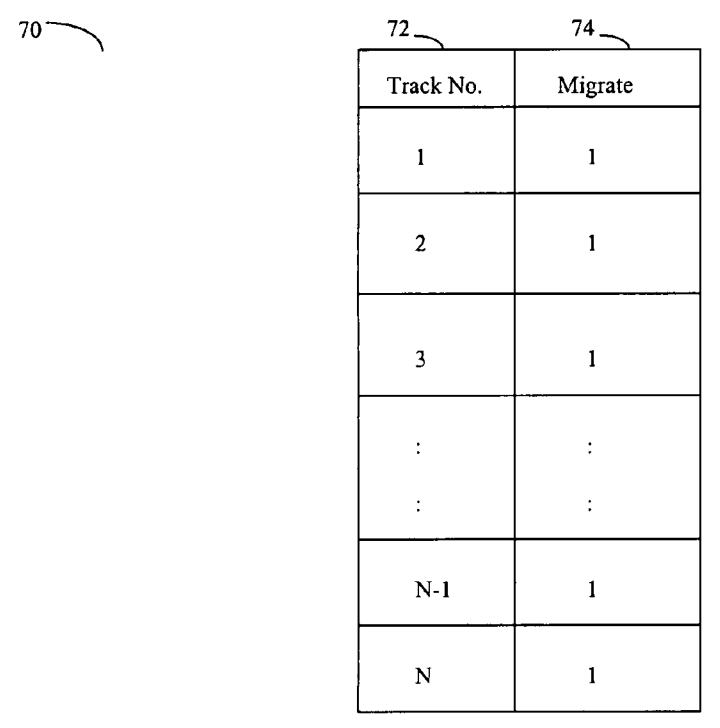

Referring now to FIG. 4, shown is an example of an embodiment of a migration bitmap 70. The migration bitmap 70 includes an entry as indicated in column 72 for each track number of device 54a and a corresponding migration status bit in column 74. In this embodiment, each bit entry has a value of 1 initially indicating that the track of data is not yet migrated or copied. A value of 0 indicates that the corresponding track of data has been migrated. The migration bitmap 70 may be stored in GM 58a. The copy operation may be performed and accordingly update the migration bitmap 70 as data is copied from device 54a to device 54b.

Additionally, code may also be executed within the data storage system 50a, while the copy operation is ongoing, to process incoming I/O data requests. The code may determine if the I/O data request is a write operation. If so, the code may use the migration bit map to ensure that the location on 54a to which a write is being performed is pushed out to device 54b prior to performing the write operation. As known to those of ordinary skill in the art, any one or more different data synchronization techniques may be used to maintain exclusive access of the migration bitmap between code performing the copy operation, and code processing the incoming I/O data requests.

Figure 5:
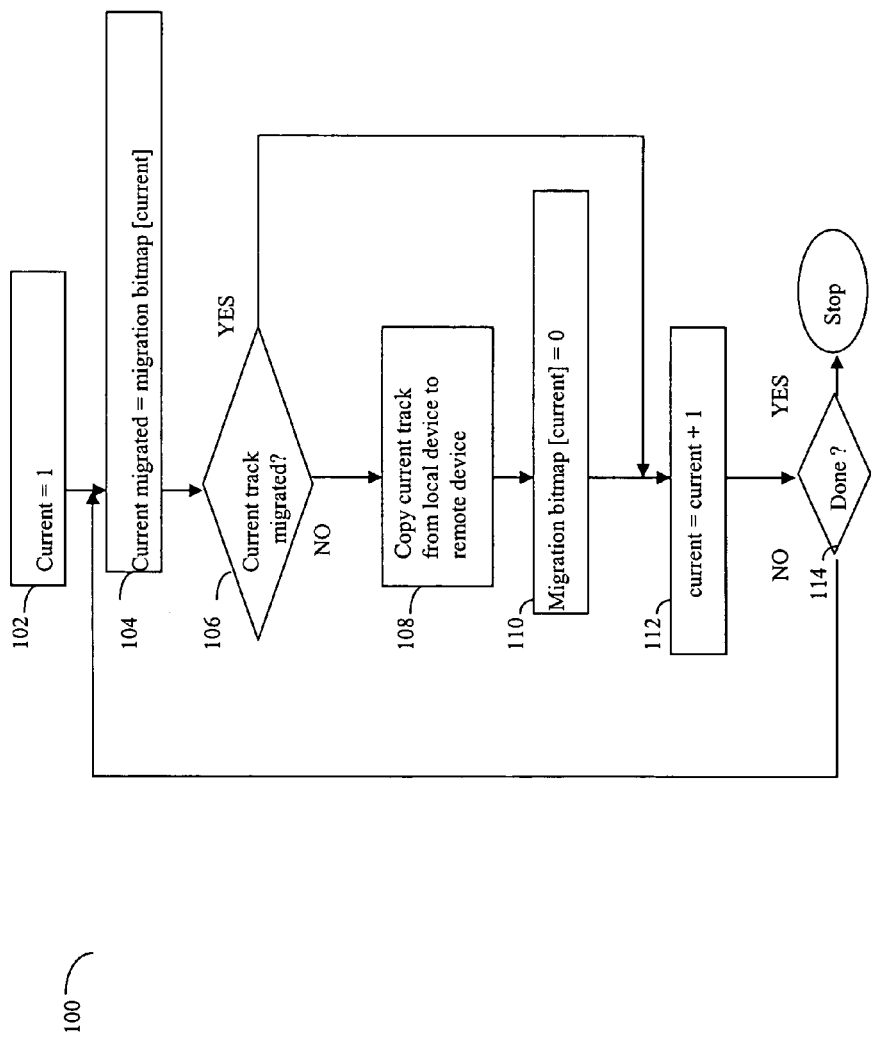
FIG. 5 is a flowchart of processing steps of one embodiment for performing a copy operation.
Figure 6:
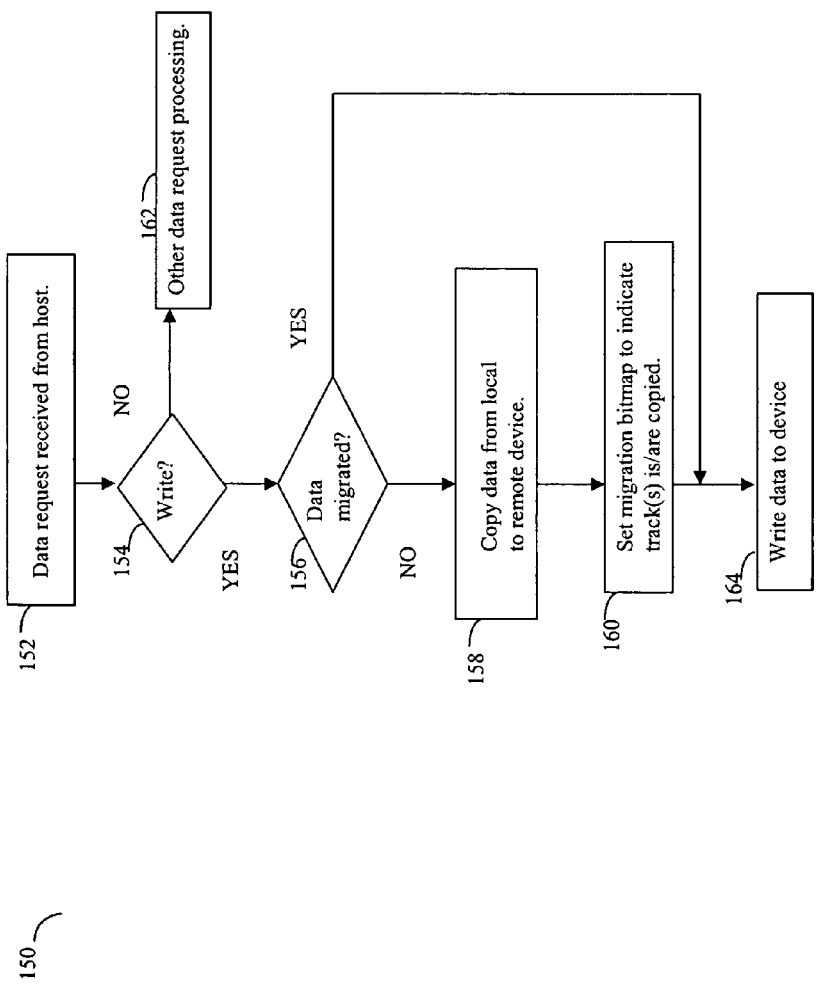
FIG. 6 is a flowchart of processing steps of one embodiment for processing an incoming data request.

What will now be described in connection with FIGS. 5 and 6 are flowcharts summarizing the processing steps described herein in connection with performing an online data migration using the migration bitmap of FIG. 4.

Referring now to FIG. 5, shown is a flowchart 100 of processing steps that may be performed in an embodiment in connection with performing a copy operation. The steps of flowchart 100 may be performed, for example, by a Fibre Channel Adapter, such as element 52a of FIG. 3, when copying data from device 54a to a remote device 54b. At step 102, a variable, current, is assigned a value of 1 to identify a current track which is being copied by the copy operation. At step 104, a variable, current migrated, is assigned the value of the migrated bitmap element associated with the current track. As step 106, a determination is made as to whether the current track has been migrated using the value obtained from the migrated bitmap at step 104. If a determination is made at step 106 that the current track has been migrated, control proceeds to step 112 where current is incremented by 1 to facilitate copying the next track. At step 114, a determination is made as to whether the copying operation is complete. If so, processing stops. Otherwise, control proceeds from step 114 to step 104 to continue migration or copying of the data.

If, at step 106, it is determined that the current track has not yet been migrated, control proceeds to step 108 where the current track of data is copied from the local device, such as 54a, to the remote device or devices, such as 54b. Once the copying of the current track has completed, control proceeds to step 110 where the current track's corresponding element of the migrate bitmap is updated to indicate that the current track has been migrated. In this example, the current track's migrate bitmap entry is set to zero. Subsequently, control proceeds to step 112 to continue processing the next track.

Referring now to FIG. 6, shown is a flowchart 150 of processing steps that may be performed in connection with processing an incoming data request to a data storage system, such as data storage system 50a of FIG. 3. The steps of flowchart 150 may be performed, for example, by an FA such as FA52a. At step 152, the data request is received from the host. At step 154, a determination is made as to whether the data request is for a write operation. It should also be noted that the write request may be for writing a portion of a single track of data, or one or more tracks of data. If it is determined at step 154 that the data request is not for a write operation, control proceeds to step 162 to perform other data request processing associated with other data operations. If, at step 154, it is determined that a write operation is associated with the data request, control proceeds to step 156 where a determination is made as to whether the data has been migrated for the location of the target of the write operation. It should be noted that the target location may be one or more tracks as described elsewhere herein. If so, control proceeds to step 164 where the write operation may proceed to write the data out to the device. Otherwise, if at step 156, it is determined that the data has not yet been migrated, control proceeds to step 158 where the data is first copied or migrated from the local device, such as 54a, to the remote device 54b. Control proceeds to step 160 where the migration bitmap has a corresponding entry set for each of the one or more tracks which have just been migrated. In this example, the migration bitmap entries each have an initial value of 1 indicating that data for the corresponding track has not yet been migrated. Once data has been migrated for a track, it's corresponding migration bitmap entry is set to zero indicating that the data migration has been completed. Control then proceeds to step 164 where the write operation processing may be performed to write the data out to the device for the data request received at step 152.

It should be noted that the foregoing processing in which data is copied from 54a to 54b may be characterized as a "push" of data from the local storage device 54a to the remote storage device 54b. The data may be copied from 54a to 54b using a copy operation. The local device is available for use online by a host while a point in time copy of the local device is being made to the remote device. It may also be the case that data is migrated in the reverse direction or "pulled" from the remote device 54b to the local device 54a. Such processing may also be performed while the local device 54a is online for use by a host. The copy task processing steps performed by FA 52a may pull the data from the remote data storage system to the local data storage system. The foregoing processing techniques may utilize a migration bitmap when performing a data migration for both the push and the pull cases while the local device is being accessed by the host.

In connection with the pull case, the data migration may take place as a copy operation to pull data from 54b to 54a. As described herein, the FA 52a may execute code to perform the copy operation for pulling data from 54b to 54a. Additionally, code may be executed to process an incoming I/O request from the host 48 to access device 54a. If the host attempts to perform a read or write operation before the data has been migrated from 54b to 54a, the data for the corresponding one or more tracks associated with the read or write operation are first pulled or copied from the device 54b to 54a prior to completing the I/O operation.

Figure 7A:
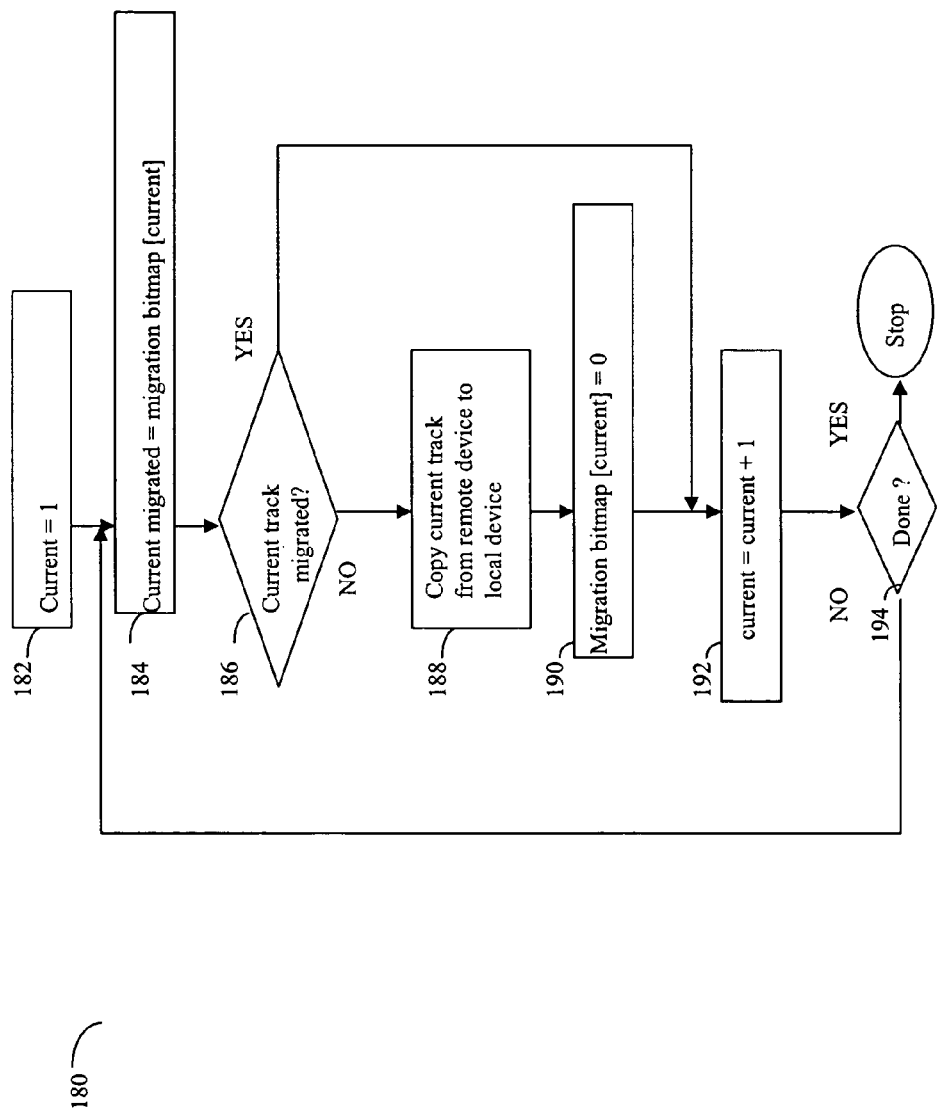
FIG. 7A is a flowchart of processing steps of another embodiment for performing a copy operation.
Figure 7B:
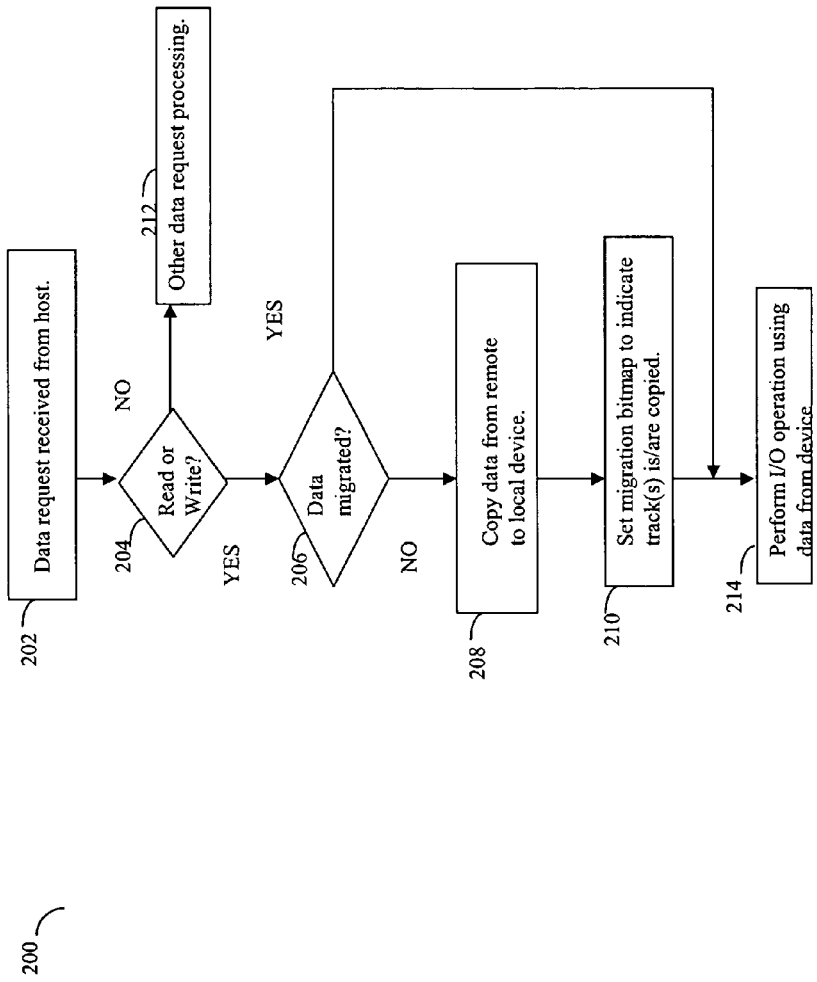
FIG. 7B is a flowchart of processing steps of another embodiment for processing an incoming data request.

What will now be described in connection with FIGS. 7A and 7B are flowcharts of processing steps that may be performed in connection with performing an online data migration when data is being "pulled" or migrated from a remote data storage system to a local data storage system while the local data storage system devices are currently available online for use by a host system connected thereto, for example, as shown in connection with FIG. 3 as described elsewhere herein.

Referring now to FIG. 7A, shown is the flowchart 180 of processing steps that may be performed by an FA, such as FA 52a of FIG. 3, in connection with performing a copy operation where data is copied from a remote device, such as 54b, to a local device 54a, using the migration bitmap described elsewhere herein. It should be noted that the steps of FIG. 7A are similar to those as described in connection with FIG. 5 with the exception of step 188 where data is copied for the current track from the remote device to the local device. At step 182, a variable, current, is set or initialized to 1 indicating the current track being processed by the copy operation. At step 184, current migrated is assigned a corresponding entry of the migration bitmap for the current track. At step 186, a determination is made as to whether the current track has been migrated from the remote to the local device. If so, control proceeds to step 192 to increment current and continue processing with the next track. Otherwise, if at step 186 the current track has not yet been migrated, control proceeds to step 188 where the current track is copied or migrated from the remote device to the local device. At step 190, the migration bitmap for the current entry is set to zero to indicate that the current track has been migrated. At step 192, current is incremented to continue processing with the next track. At step 194, a determination is made as to whether all the tracks have been copied by the copy operation. If so, processing stops. Otherwise, control proceeds to step 184 to continue processing with the current track.

Referring now to FIG. 7B, shown is a flowchart 200 of processing steps that may be performed in connection with processing incoming data requests received from the host such as the host 48 when it is received by the data storage system such as data storage system 50a. The processing steps of flowchart 200 may be performed by, for example, the FA 52a controlling access to the device 54a.

At step 202, a data request is received from the host by the data storage system 54a. A determination is made at step 204 as to whether this request is for a read or a write operation. If not, control proceeds to step 212 to do other data request processing. If at step 204, it is determined that the data request received is for a read or a write operation, control proceeds to step 206 where a determination is made as to whether the data associated with the portion of the device indicated by the I/O operation has been migrated. If so, control proceeds to step 214 to continue with the I/O operation processing. Otherwise, if at step 206 it is determined that the data portion designated by the I/O operation for device 54a has not yet been migrated, control proceeds to step 208 where the data portion is copied from the remote device to the local device. At step 210, a corresponding one or more entries in the migration bitmap is set to indicate that the appropriate one or more tracks at step 208 have been copied. Control proceeds to step 214 to then continue processing with the request received at step 202.

It should be noted that in the foregoing paragraphs and as elsewhere described herein, the processing steps associated with performing an online data migration may be performed by a component other than as described herein in other embodiments. Additionally, the particular data structures, such as the migration bitmap data structure, although may be described as being stored in the global memory may also be stored in other locations than as described herein. The examples described herein for purposes of illustration of the techniques should not be construed as a limitation.

It should also be noted that in connection with the foregoing processing when data is being migrated from a remote device to a local device, such as for the pull data case, in the event that data from a remote device is not accessible, an embodiment may take any one or more different actions. An embodiment may, for example, retry accessing the remote device a specified number of times prior to issuing an error and aborting the host's data request. Other embodiments may perform other processing steps than as described herein.

In connection with the foregoing online data migration techniques, reference is made to an embodiment, for example, as illustrated in FIG. 3 with a single host connected to a local data storage system. It may also be the case that an embodiment may have both the local and the remote data storage systems online and accessible for use by one or more hosts.

Figure 8:
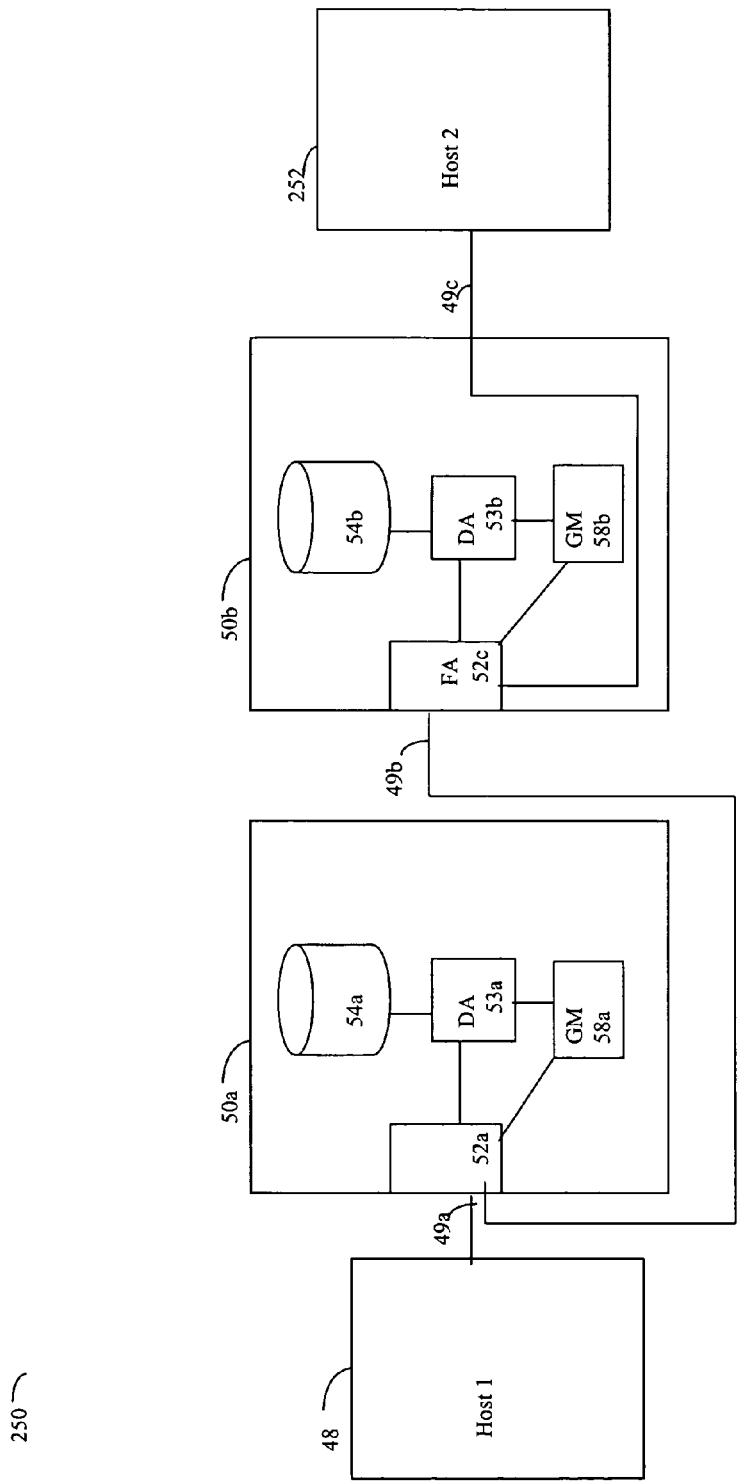
FIG. 8 is an example of an embodiment of a system that may be used in connection with performing an online data migration using the techniques described herein.

Referring now to FIG. 8, shown is an example 250 of another embodiment of a computer system that may utilize the techniques described herein in connection with performing an online data migration. The components of FIG. 8 are similar to those as described, for example, in connection with FIG. 3 with an additional host 2 252 connected to the data storage system 50b. The host 2 252 may communicate with the data storage system 50b over connection 49c in a manner similar to the way host1 48 communicates with data storage system 50a over connection 49a. The data storage system 50b may be characterized as local to host2 252. The data storage system 50a may be characterized as local with respect to host1 48.

The techniques described herein in connection with performing an online data migration may be used when both host1 and host2 are online and respectively using data storage systems 50a and 50b. The use of the techniques when performing a data push or a data pull with respect to data storage system 50a when both the local and remote data storage systems are online will now be described in more detail.

Figure 9:
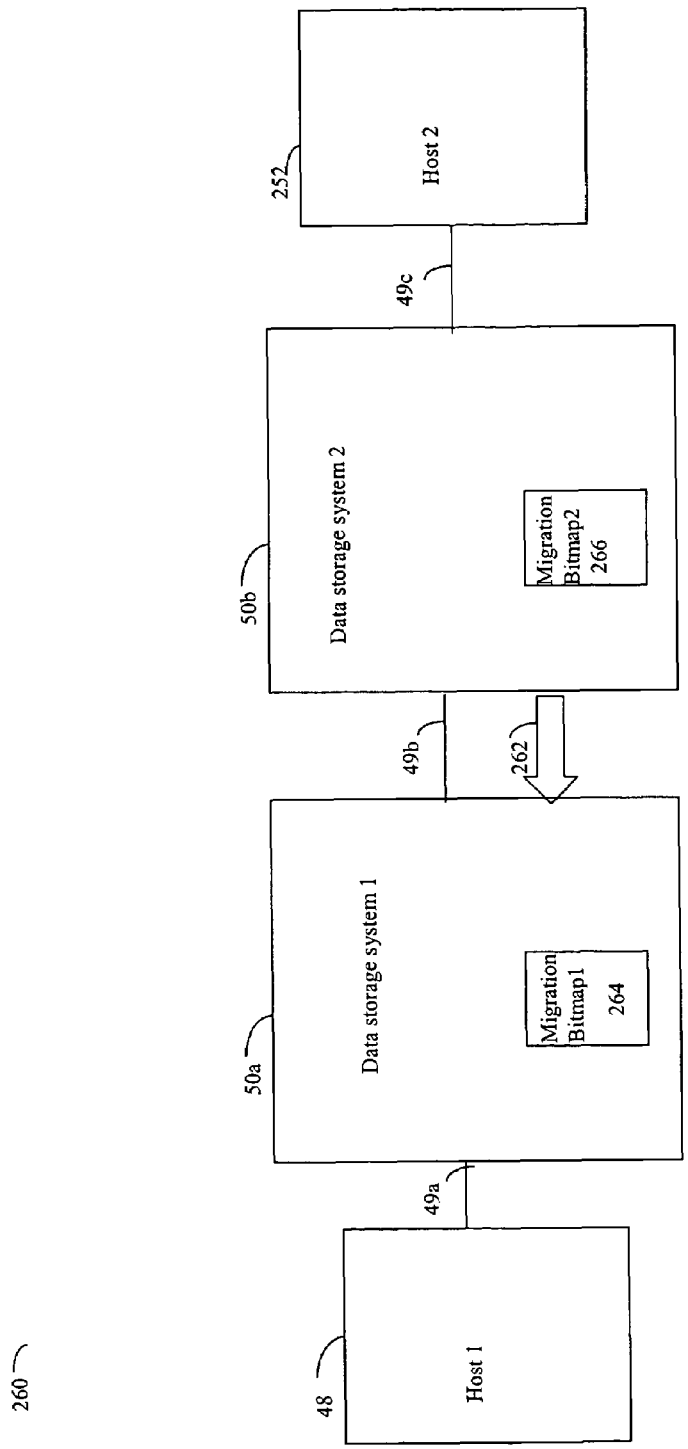
FIG. 9 is another representation of the components of FIG. 8.

Referring now to FIG. 9, shown is an example 260 depicting another representation of the components of 250 of FIG. 8. It should be noted that various elements have been omitted for the sake of simplicity illustrating the techniques described herein. Referring to 260, an example will be illustrated where an online data migration is being performed for a data pull as indicated by the directional arrow 262. In other words, data is being pulled from data storage system 50b to data storage system 50a while host1 48 is allowed to performed I/O operations to data storage system 50a, and additionally, while host2 52 is allowed to perform I/O operations to data storage system 50b.

Included in data storage system 50*a* is a first migration bitmap 264 as described, for example, with reference to FIG. 4. Included in data storage system 50*b* is a second migration bitmap 266. Each of the foregoing migration bitmaps may be stored in a global memory, as described elsewhere herein, of each of the respective data storage systems. In this example where both host 1 and host 2 are online accessing data storage systems, code is executed by both the first data storage system 50*a* and the second data storage system 50*b*. Code may be included and executed by the first data storage system 50*a* which pulls the data from data storage system 50*b* to data storage system 50*a*. The code that pulls the data from data storage system 50*b* to 50*a* may perform processing steps as described in connection with FIG. 7A, flowchart 180. The foregoing processing steps for pulling data to data storage system 50*a* may be performed, for example, by a Fibre Channel Adapter included in the first data storage system 50*a*. Additionally, this code located on the first data storage system which pulls that data from the second to the first data storage system 50*a* may also update the migration bitmap 264 of data storage system 50*a* and also synchronize any changes between 264 and 266 as used by data storage system 50*b*. When the Fibre Channel Adapter executes code within the first data storage system 50*a* to pull data from the second data storage system 50*b* to the first data storage system 50*a*, the migration bitmap 264 of data storage system 50*a* is accordingly updated as data is migrated. Additionally, this code accordingly communicates with system 50*b* to update the migration bitmap 266 of the second data storage system 50*b*. These changes to the migration bitmap 264 may be propagated to 266 using connection 49*b* to the second data storage system.

Code may also be executed on the first data storage system in connection with processing incoming I/O operation requests from host 1 148. This code may perform processing steps as described, for example, in connection with FIG. 7B, flowchart 200 which is described elsewhere herein in more detail. The code on data storage system 1 50*a* for processing incoming host I/O or data requests determines if the incoming request is for a read or write operation. If so, and the corresponding data has not yet been migrated from data storage system 50*b*, a data migration is performed prior to completing the read or write operation. This code for processing host I/O read and write operations on data storage system 50*a* also updates the migration bitmaps of both 50*a* and 50*b* as data migration is performed for each track of data.

Data storage system 2 of 50*b* includes code for processing incoming I/O requests from host 2 252. The code for processing incoming I/O requests may include those steps, for example, as described in connection with flowchart 150 of FIG. 6 in which a determination is made if the request is for a write operation from host2 252. If so, and the data has not yet been migrated from 50*b* to 50*a*, the data is migrated to 50*a* before processing the write request from host2 252. This code for processing write operations received on data storage system 50*b* also updates the migration bitmaps of both 50*a* and 50*b* as data migration is performed for each track of data.

The foregoing techniques may be used when both the source and the target devices of a data migration are available online for use by hosts while the data migration is ongoing using the migration bitmap stored on each of the data storage systems. If a read or write operation occurs to the data storage system which is the target of the data migration, the data is migrated to the target prior to performing the I/O operation if the data has not already been migrated. If a write operation is performed to the source of a data migration prior to migrating the data to the target, the data is migrated from the source to the target prior to executing the write operation to the source of the migration.

Referring to FIG. 9, when the code for performing a data pull from 50*b* to 50*a* is executed and the source device(s) are online, the code for the data pull may communicate with the data storage system 50*b* to initiate execution of code on the data storage system 50*b*, such as to perform the data push when needed in accordance with the steps of flowchart 150 of FIG. 6.

As will be apparent to those of ordinary skill in the art, the foregoing techniques may also be used with both the source and the target of a data migration available online when doing a data push, for example, from data storage system 50*a* to data storage system 50*b*. Additionally, it should be noted that a read or a write operation used in connection with the foregoing techniques may be a read or a write operation involving a partial track of data. If a host performs a write operation to a local device for a write of a partial track of data and data is being migrated to the local device from the remote device, the data of the complete track is read first prior to applying the write operation.

The foregoing techniques may be used in connection with creating a point in time copy where data is either pushed to one or more target devices or pulled to one or more of the source devices available online during the data migration. What will now be described are techniques that may be used with a migration bitmap to allow for a restoration to a point in time copy. In addition to utilizing the migration bitmap in the foregoing examples, an embodiment may use a change bitmap to identify which particular tracks of data have been modified.

Figure 10:
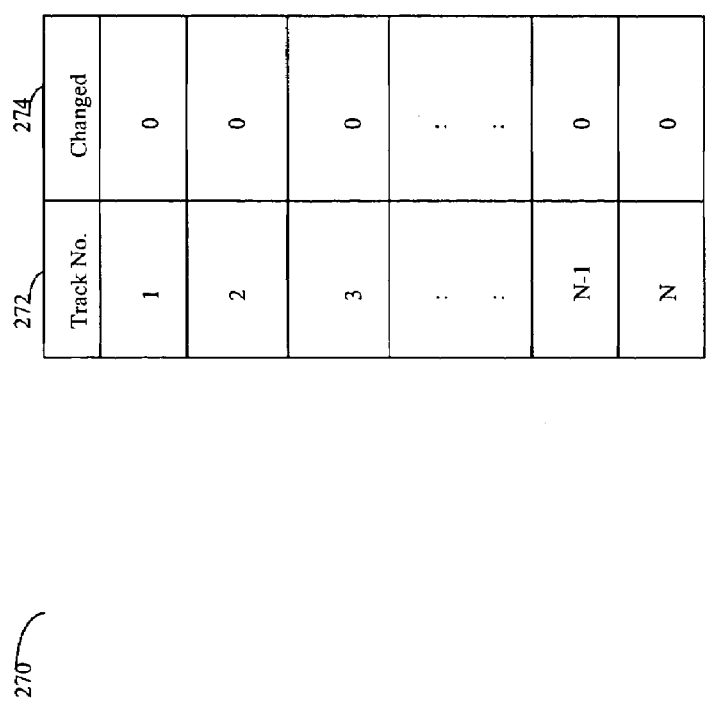
FIG. 10 is an example of an embodiment of a change bitmap.

Referring now to FIG. 10, shown is an example of a change bitmap 270 that may be used in connection with indicating whether a particular track of data on a device has been modified with respect to a particular point in time copy. Bitmap 270 includes an entry in column 272 for a particular track number of a device, and a bit value in the changed column 274 indicating whether the data on that particular track has been updated. In this embodiment, all of the elements in the changed column 274 are initialized to zero indicating that no modification has been made to the data. It should be noted that the modifications as indicated by the changed bit in the column 274 are with respect to a particular point in time copy of the data. The bit value in column 274 for each particular track of data may be set to 1 when a write operation occurs to a portion of that particular track.

Figure 11:
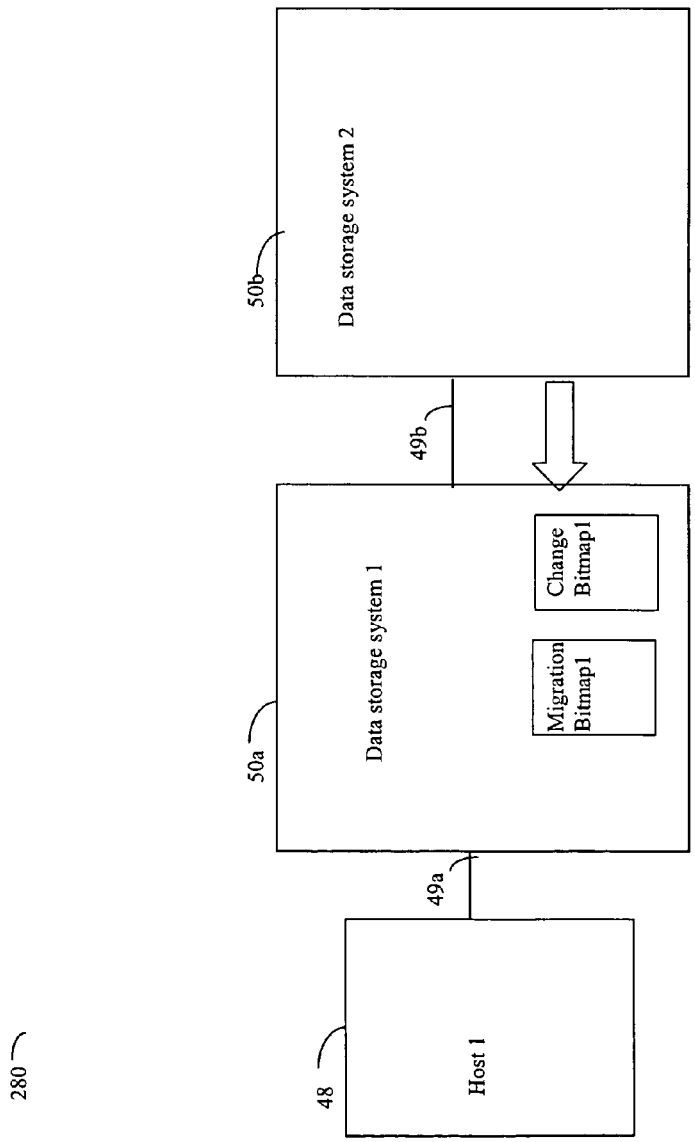
FIG. 11 is another example of an embodiment of a computer system illustrating use of techniques described herein.

Referring now to FIG. 11, shown is an example of an embodiment of a computer system 280 including a first and second data storage system with a host 48. Although what will now be described is the use of the change bitmap with the migration bitmap for a data pull, those of ordinary skill in the art will recognize that the techniques described herein may also be used in connection with performing a data push from data storage system 1 50*a* to data storage system 2 50*b* using both the migration and change bitmaps.

A point in time copy may be made of one or more devices from data storage system 50*b* to data storage system 50*a*. The migration bitmap indicates the status of this data migration for each of the particular tracks as described elsewhere herein. Additionally, a change bitmap may be maintained which is updated each time host 48 performs a write operation to a track, or a portion thereof, for a device in data storage system 50*a* while the data migration or pulling is ongoing. Code may be executed and stored within the first data storage system 50*a* in this example for processing incoming read requests from the host 1 48. When the data storage system 50*a* receives a request to perform a read operation and the data has not yet been migrated from 50b to 50a, the data is migrated prior to completing the read operation. After the data is migrated, code in the data storage system 50a sets a corresponding one or more bits in the migration bitmap. Additionally, code may be executed within data storage system 50a which determines if an incoming data request is for a write operation. If so, and the data has not yet been migrated from data storage system 50b to 50a, the data is migrated from 50b to 50a and the corresponding migration bitmap entries are updated. Additionally, the write operation is subsequently applied and the corresponding one or more bits in the change bitmap are also set in accordance with the write operation. At some point later, the data copying or migration from data storage system 2 50b to data storage system 1 50a may be complete. In connection with the foregoing techniques, the change bitmap then indicates the changes or writes that have been performed by the host 1 48 with respect to the point in time copy of the data from data storage system 50b. It may be desirable at yet a later point in processing to restore data storage system 1 50a to the point in time copy of the data from data storage system 50b. In other words, those changes that have occurred as indicated by the change bitmap may be reversed. Rather than make another complete copy and migrate all of the data once again from data storage system 50b to 50a, the change bitmap may be used as the migration bitmap to indicate those tracks which need to be migrated from data storage system 50b to data storage system 50a to restore data storage system 50a to the point in time copy as reflected in data storage system 50b. Accordingly, a copy operation may be performed to copy those tracks as indicated by the change bitmap having an entry of 1 from data storage system 50b to data storage system 50a. In the foregoing, the change bitmap may be used as a subsequent migration bitmap as part of an efficient data restoration technique to restore a data storage device or devices to a particular point in time copy. It should also be noted that the change bitmap may also be used to indicate those portions in the copy of 50b that need to be updated to synchronize the copy of 50b to be like the data copy of 50a.

What will now be described are flowcharts in connection with performing the processing steps just described using the migration and change bitmaps.

Figure 12:
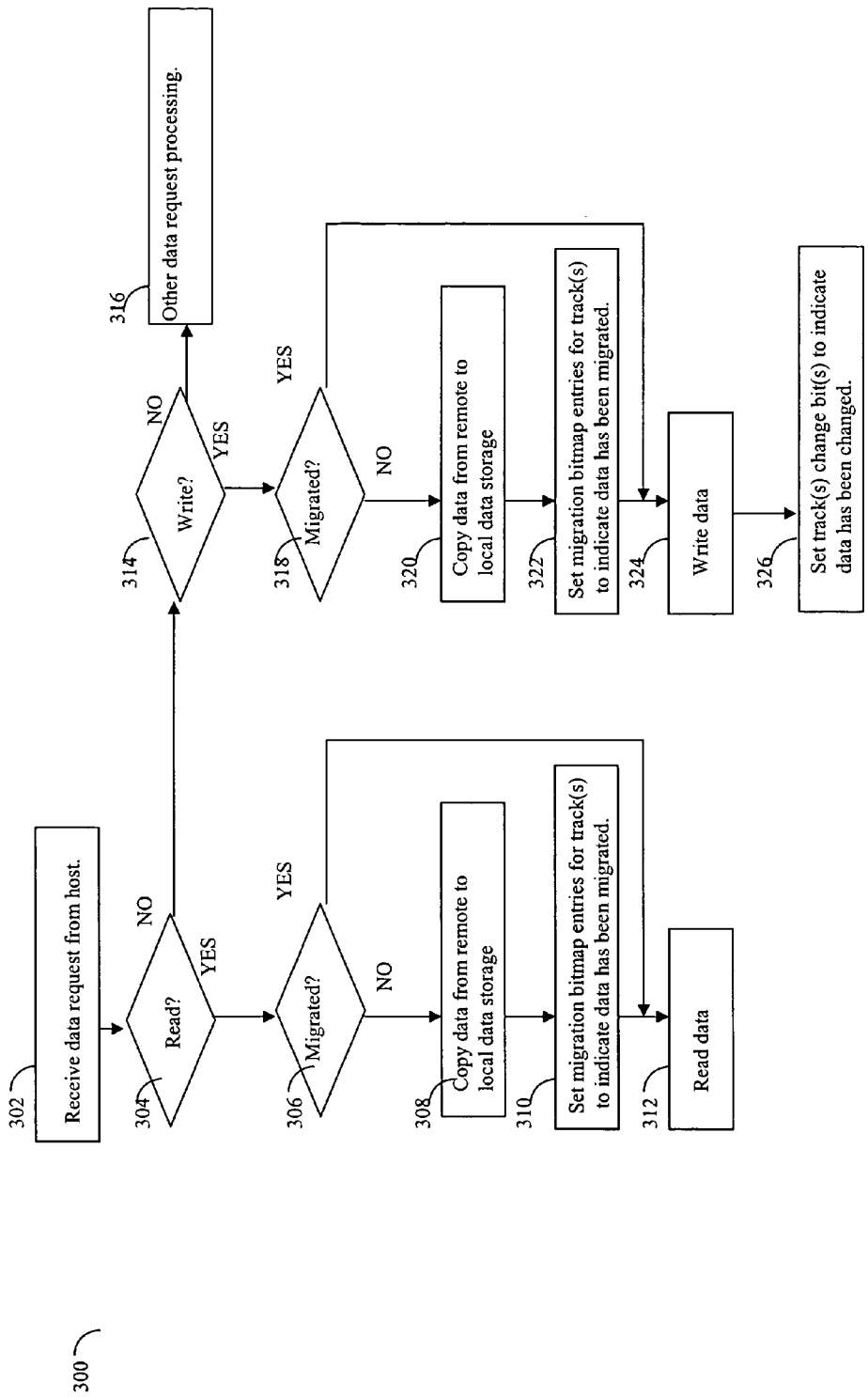
FIG. 12 is a flowchart of processing steps of one embodiment for processing a data request using the change and migration bitmaps.

Referring now to FIG. 12, shown is a flowchart 300 of processing steps for a pull operation that may be performed in an embodiment with reference to FIG. 11 using the migration and change bitmap. At step 312, a data operation request is received from the host. At step 304, a determination is made as to whether the operation is a read. If so, control proceeds to step 306 to further determine if the data associated with the read operation has been migrated. If so, control proceeds to step 312 to read the data. Otherwise, control proceeds to step 308 to copy data from the remote to the local data storage system at step 308 and, at step 310, accordingly set the appropriate migration bit(s) of the copied tracks to indicate that the data has been migrated. Control proceeds to step 312 to then perform the read operation request and return data to the host.

If, at step 304, it is determined that the data is not a read operation, control proceeds to step 314 to determine if the data request is for a write operation. If not, control proceeds to step 316 to perform other data request processing. Otherwise, control proceeds to step 318 to determine if the target location of the write operation has had corresponding data already migrated from the remote to the local storage system. If so, control proceeds to step 324 where the write operation is performed and the appropriate change bits in the change bitmap are set at step 326. Otherwise, if step 318 determines that the data has not yet been migrated, control proceeds to step 320 where the data is copied from the remote to the local data storage system. Subsequently at step 322 the appropriate migration bitmap entries are set to indicate that the tracks of data have been migrated. Control proceeds to step 324 to complete the write operation and step 326 to set the appropriate change bitmap entries.

The foregoing processing steps of flowchart 300 provide for copying data from a remote to a local data storage system such that the local data storage system has a point in time copy of the remote data storage system with any additional write requests issued by the host applied to the particular point in time copy of data. The additional write requests with respect to the point in time copy of data are recorded in the change bitmap. In the event that it is desirable to restore the local data storage system once again to the remote data storage system point in time copy, the change bitmap may be used as the migration bitmap to indicate those tracks of data which again need to be copied from the second or remote data storage system to the local data storage system. The change bitmap may also be used in another way for an incremental backup of the local data storage system to the remote data storage system. Those elements of the change bitmap indicate those tracks which may be copied from the local to the remote data storage system so that the remote data storage system will be a copy of that data from the local system.

It should be noted that the techniques described herein associated with pushing and/or pulling data may be performed with respect to multiple devices. Additionally, the techniques described herein may be performed with respect to all of a device or a portion of a device.

Figure 13:
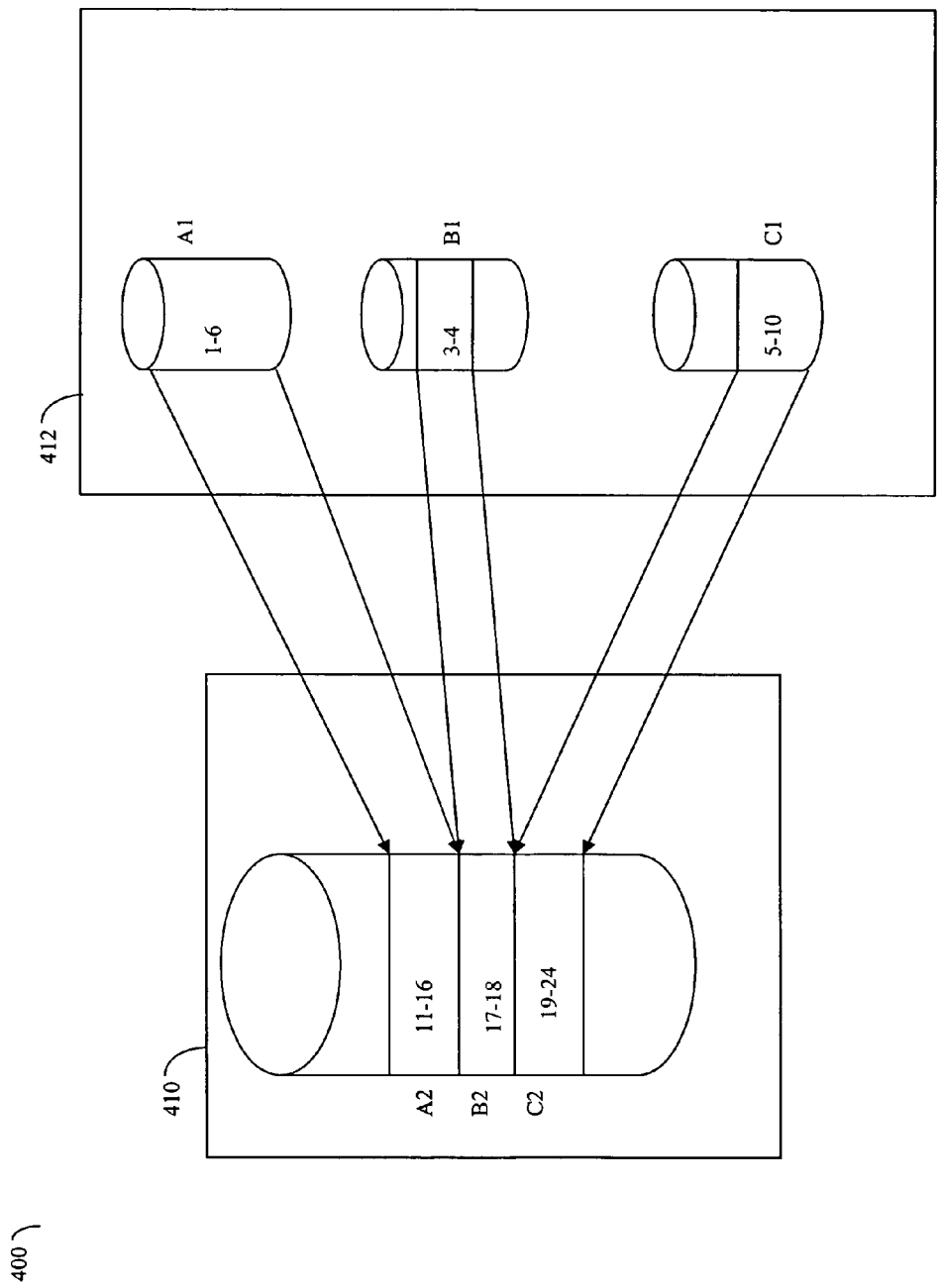
FIG. 13 is an example illustrating use of multiple source devices with a single target device for data migration with multiple sessions.

For example, referring now to FIG. 13, shown is an example 400 illustrating a source data storage system and a destination or target data storage system with respect to multiple data pull sessions for data consolidation. In this example, the data storage system 410 may be the target data storage system resulting from migrating data from corresponding portions of multiple data storage devices in source data storage system 412. In this example, data is being migrated from data storage devices A1, B1, and C1 of data storage system 412. The entire data portion of device A1 is migrated to the data storage system 410 having a corresponding portion A2 in a first pull session. A portion of device B2 is migrated to the data storage system 410 having a corresponding device portion B2 in a second pull session. The corresponding portion of device C1 is migrated from the data storage system 412 to the data storage system 410 have a corresponding portion C2 in a third pull session. The data migration for copying operations may gather data from all or portions of one or more devices as illustrated in connection with 400 of FIG. 13.

Use of the foregoing as illustrated in FIG. 13 provides for concatenating different portions of data from one or more source devices included in data storage system 412 into a single contiguous data portion on a destination such as the device of the data storage system 410 using multiple pull sessions.

The techniques described herein using the migration and the change bitmap may be used in connection with performing an incremental backup as well as other applications as will be described in following paragraphs.

Figure 14:
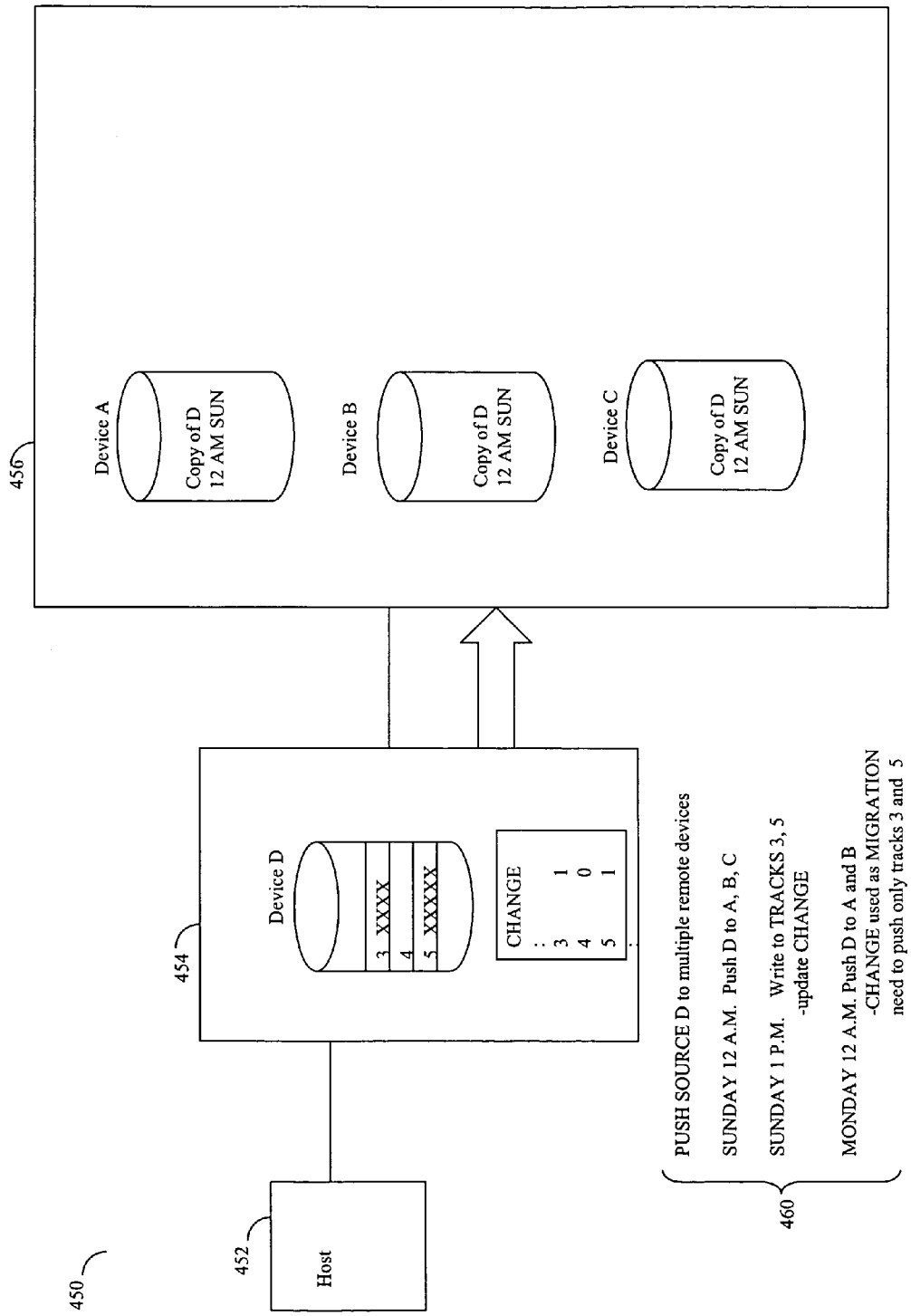
FIGS. 14 and 15 are other examples of systems that may be used in connection with the migration techniques described herein.

Referring now to FIG. 14, shown is an example of a system 450 that may be used in connection with techniques described herein. The system 450 includes the host 452, a first local data storage system 454 and a second remote data storage system 456. Element 460 describes processing steps that may be performed on the components included in 450. In this example, on Sunday at 12:00 a.m., a backup is performed of the local data storage device D in triplicate such that device D has its data pushed to devices A, B and C within the data storage system 456. This may be performed using the processing steps associated with the copying or migration operation as described elsewhere herein. Subsequently, at 1:00 p.m. on Sunday, a write operation is issued from host 452 and received at the data storage system 454 indicating a write to tracks 3 and 5 of device D. A change bitmap is maintained within the data storage system 454 and the corresponding portions of change bitmap are updated to indicate that a write has been performed to tracks 3 and 5. Subsequently, a second differential backup is made on Monday at 12:00 a.m. where the contents of device D are pushed this time only to devices A and B. Since Sunday has been a relatively slow day as indicated by the changes indicated in the change bitmap of 454, only tracks 3 and 5 have changed. In performing this incremental backup Monday at 12:00 a.m. of device D to devices A and B of the remote storage system 456, the change bitmap of 454 may be used as the migration bitmap. Accordingly, devices A and B may be updated to the point in time copy of Monday at 12:00 a.m. by only pushing tracks 3 and 5 from device D to devices A and B of the data storage system 456 as indicated by the "1" entries in the change bitmap of 454.

The foregoing illustrates the use of change bitmap for performing an incremental backup with respect to a prior point in time copy. It should be noted that multiple change bitmaps may be used to represent a change status at multiple corresponding points in times with respect to a point in time copy. For example, a second change bitmap may be used to represent the changes made with respect to device C.

As described elsewhere herein in connection with use of the migration bitmap, the use of the migration and the change bitmap may also be used where both the source and the destination or target device(s) associated with the data migration are available online for use by hosts.

Figure 15:
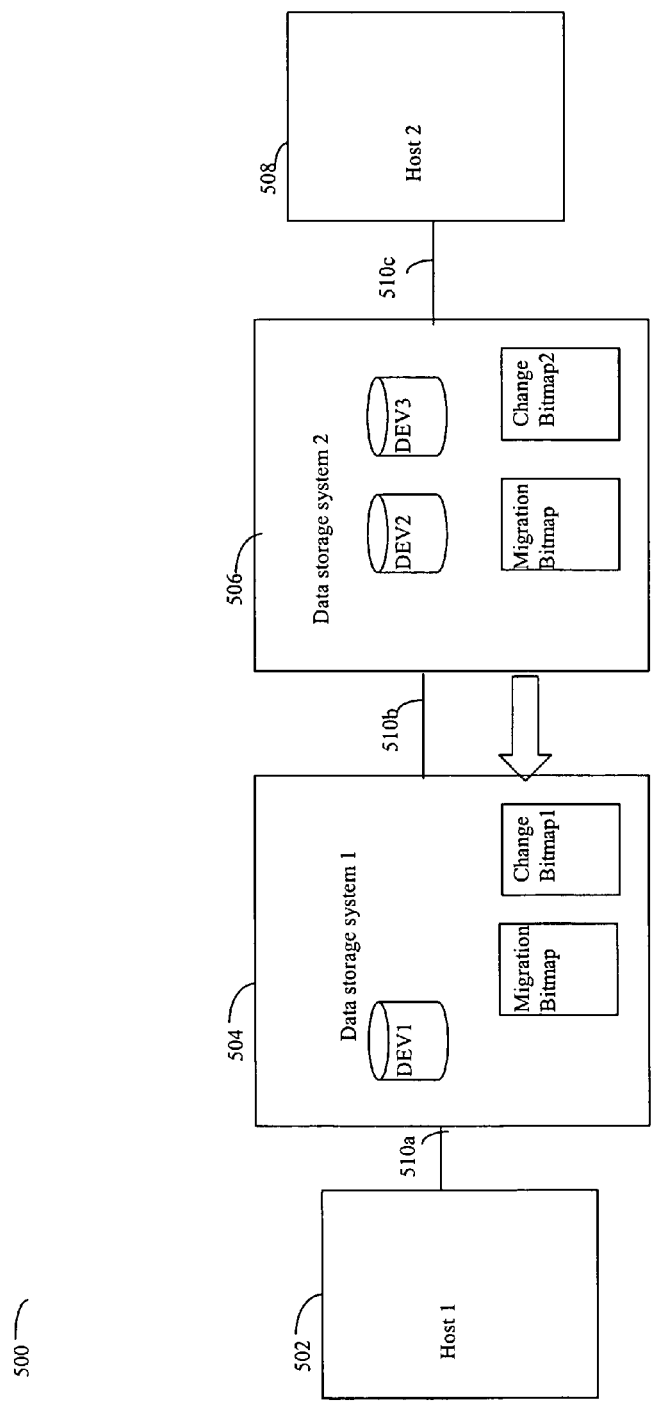

Referring now to FIG. 15, shown is an example of an embodiment of a system 500 that may be used in connection with performing an online data migration where both the source and the target data storage systems associated with the data migration are available online. It should be noted that although this example is described with respect to a data pull where data is being pulled from a data storage system 506 to the data storage system 504, the techniques described herein may also be used in connection with performing a data push operation as will be readily apparent to those of ordinary skill in the art. In this example, the migration bitmap as maintained by the data storage system 504 and 506 are synchronized to indicate the status of the migration of data from 506 to 504 for one or more devices therein. Any one of a variety different techniques may be used to synchronize access to the bitmaps within a single data storage system and on both data storage systems. In one embodiment, a task executing on one of the data storage systems which updates both bitmaps on both data storage systems may obtain locks on all portions of the bitmaps needed to perform the updates prior to continuing execution.

Figure 16:
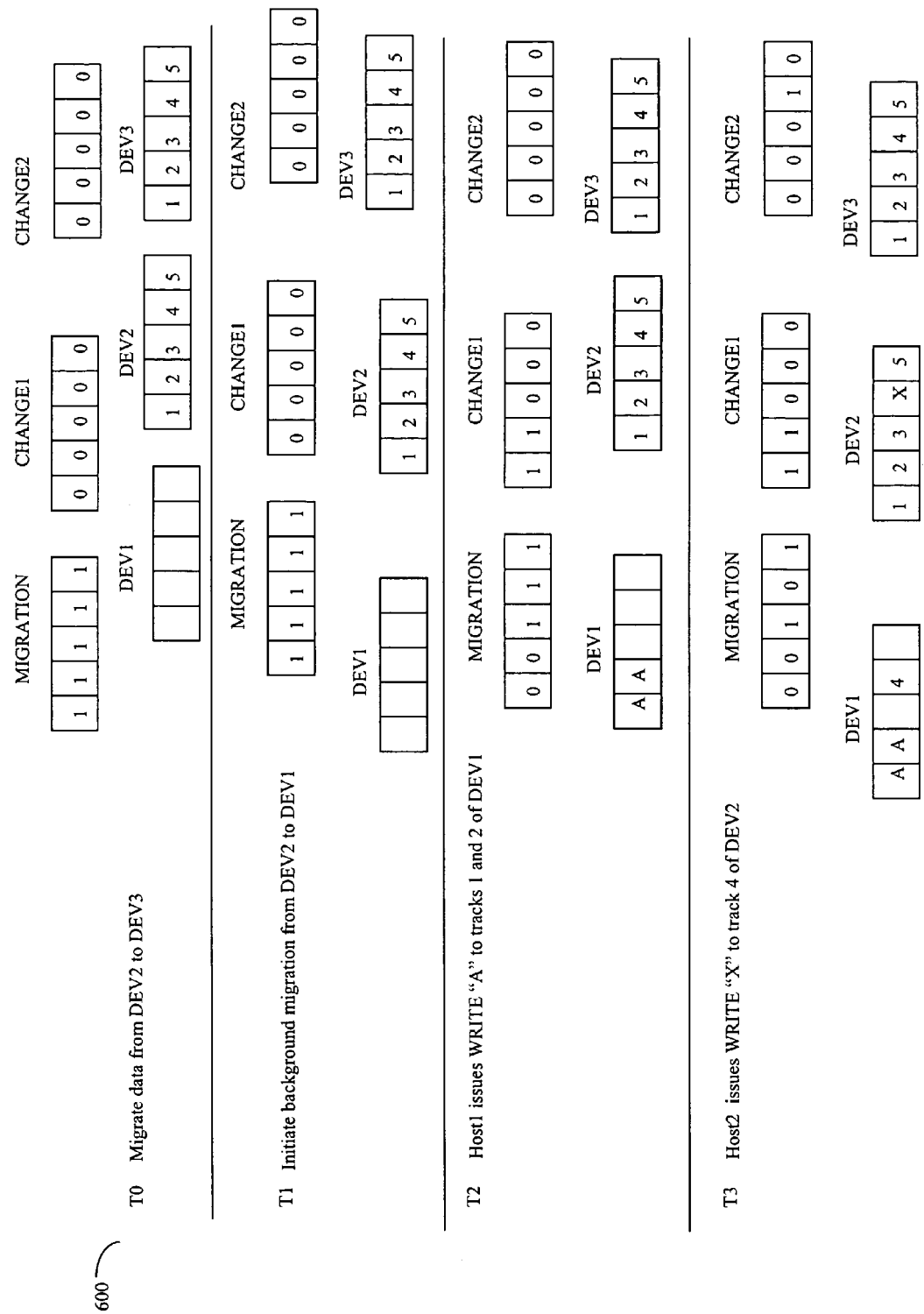
FIGS. 16 and 17 illustrate the state of different data elements at various points in time of a data migration.
Figure 17:
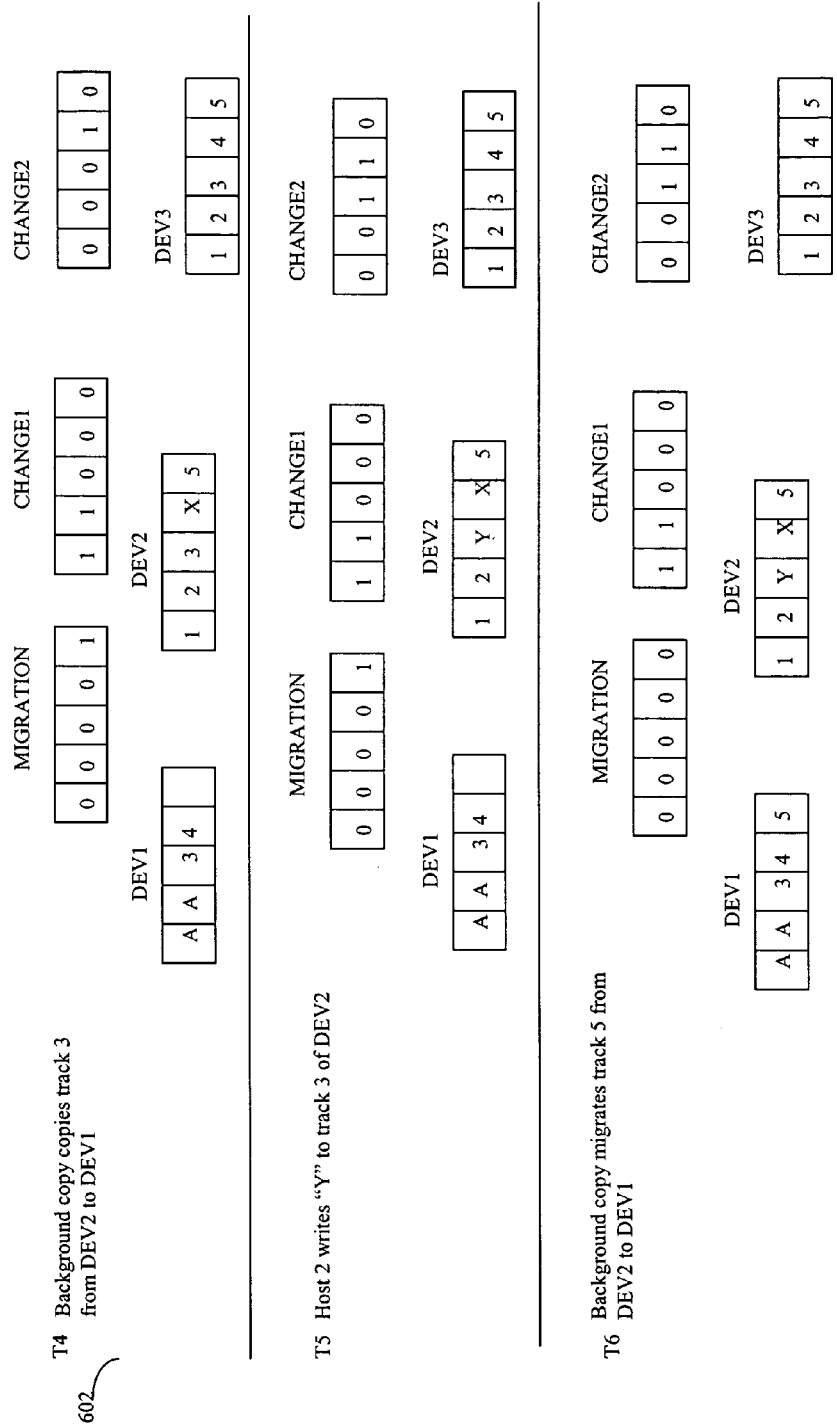

What will now be described with reference to FIG. 15 and FIGS. 16 and 17 are various operations and the associated resulting state of the migration bitmap, change bitmap and content of a particular device within data storage system 506 being migrated to data storage system 504. With reference to FIGS. 16 and 17, DEV 2 and DEV3 are devices included within data storage system 506, and DEV 1 is a device included within data storage system 506. In each of FIGS. 16 and 17 on the left side is a processing step with the resulting state change indicated by data elements in the right hand portion. In FIGS. 16 and 17, it should be noted that the MIGRATION element represents the state of both the MIGRATION1 and MIGRATION 2 bitmaps of FIG. 15 as maintained on the two different storage systems. In this example, the contents of MIGRATION1 and MIGRATION2 are synchronized to include the same representation during operation of the example using the techniques described herein being illustrated.

At a time T0, a complete copy of DEV2 may be made on DEV3. At some point later at a time T1, a migration task is initiated to begin pulling data from DEV 2 to DEV 1. Immediately after the copying task is initiated at step T1, no data has yet been migrated and no data operations received by either data storage system. The necessary code on the other data storage system 506 for processing incoming I/O requests is also initialized. At a second time T2, host 1 issues a write of the letter A to tracks 1 and 2 of device 1. As indicated by the data element associated with T2, DEV 1 has its content updated for tracks 1 and 2, and the change 1 bitmap has entries 1 and 2 corresponding to tracks 1 and 2 of DEV1 also updated. Using the techniques described herein, the migration bitmap as maintained by both data storage system 504 and 506 has the first and second element with a value of zero with the remaining elements having a value of 1 indicating that 1 and 2 tracks have been migrated from DEV 2 to DEV 1. At a later time T3, host 2 issues a write of the value of X to track 4 on DEV 2. In this instance, data storage system 506 performs processing to migrate track 4 from DEV 2 to DEV 1 prior to performing a write of the value of X to track 4 on DEV 2. The change 2 bitmap is updated having its fourth entry with a value of 1 corresponding to the fourth track being written to. Additionally, the migration bitmap (on both data storage systems) has its fourth entry updated to indicate a value of zero that track 4 has been migrated from DEV 2 to DEV 1. At a later time T4, the copy task (pulling data) executing on system 504 now copies track 3 from DEV 2 to DEV 1. The migration bit vector has the third entry corresponding to track 3 set to zero indicating that the migration of data from DEV 2 to DEV 1 has been completed for track 3. The data migration of track 3 from DEV 2 to DEV 1 results in an original value of 3 being copied from track 3 of DEV 2 to track 3 of DEV 1 as also indicated by the elements associated with step T4. At a step T5, host 2 then writes a value of Y to track 3 on DEV 2. This is indicated by the change 2 bitmap having its third element with a value of 1, and a corresponding entry for track 3 of DEV 2 having a data value of Y. At a step T6, the copy task completes the migration by migrating data for all remaining tracks (which is track 5 in this example) from DEV 2 to DEV 1. This results in data being copied as from the fifth element of DEV2 to the fifth element of DEV1 and the fifth element of the migration bitmap set to zero.

The change 1 bitmap indicates those changes that have been made by host 1 to DEV 1 with respect to the point in time copy at T1 of DEV 2. This point in time copy resides on DEV3. Similarly, the change 2 bitmap indicates those changes that have been made to DEV 2 with respect to the point in time copy of DEV 2 at time T1. Previously, at a time T0, a first backup copy of DEV 2 was made on DEV 3. A copy of DEV 3 may be synchronized to be like that of DEV 1 by using the change 1 bitmap as the migration bitmap indicating those values to be migrated to DEV 3 to synchronize DEV 3 with the copy of the data on DEV 1. Similarly, the change 2 bitmap may be used as the migration bitmap in order to synchronize the contents of DEV 3 to be like that of DEV 2. Wherever there is a 1 indicated in the change 2 bitmap, that data track may be migrated from DEV 2 to DEV 3 such that DEV 3 and DEV 2 are synchronized. The foregoing are just some examples of how the change and migration bit vectors may be used in connection with online data copying.

The foregoing techniques may be used in an embodiment with standard read and write operations in order to push and/or pull data using various SCSI commands between the data storage systems using the techniques described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for copying data from a source device to a target device comprising:
    performing a copy operation copying data from said source device to said target device;
    if a write operation is performed to a first data portion of the target device prior to the first data portion associated with said write operation being copied to said target device, copying said first data portion to said target device and performing said write operation;
    if a read operation is performed for another data portion of the target device prior to the another data portion associated with said read operation being copied to said target device, copying said another data portion to said target device and performing said read operation; and
    if a write operation is performed to a second data portion of the source device prior to the second data portion associated with said write operation being copied to said target device, copying said second data portion to said target device and performing said write operation to said source device.

2. The method of claim 1, wherein said copy operation, said copying said first data portion, said copying said another data portion, and said copying said second portion, update a migration bitmap having one or more entries in which each entry is associated with a portion of said target device.

3. The method of claim 2, wherein each of said entries in said migration bitmap is associated with a track of data.

4. The method of claim 3, wherein each of said entries has a value of 0 when a track of data associated with said each entry has been migrated, and a value of 1 otherwise.

5. The method of claim 4, further comprising:
    initializing each entry in said migration bitmap to 1, and wherein each of said copy operation, said copying said first data portion, said copying said another data portion, and said copying said second portion modifying an entry in said migration bitmap to 0 after a corresponding track of data has been migrated from said source device to said target device.

6. The method of claim 1, wherein a first host issues a data request to a first data storage system including said source device and a second host issues a data request to a second data storage system including said target device, said first data storage system being remote with respect to said second data storage system.

7. The method of claim 6, wherein said copy operation is performed by code executing on either said first or said second data storage system in accordance with which of said data storage systems is controlling a data migration from said source device to said target device.

8. The method of claim 6, further comprising:
    updating one or more entries in a change bitmap associated with one of said source device or said target device indicating one or more modified portions of said one device in accordance with a request for performing a write operation for said one device.

9. The method of claim 8, wherein each entry in said change bitmap is associated with a track of data on said one device, said each entry in said change bitmap have a value of 1 if a corresponding track of data on said one device has been modified and a value of zero otherwise.

10. The method of claim 9, the method further comprising:
    performing an incremental backup of said source device to said target device using said change bitmap as a migration bitmap indicating which tracks of data to copy from said source device to said target device, wherein each track of said source device having a corresponding entry of 1 in said migration bitmap is copied from said source device to said target device.

11. A computer readable medium for copying data from a source device to a target device, the computer readable medium comprising executable code stored thereon that:
    performs a copy operation copying data from said source device to said target device;
    if a write operation is performed to a first data portion of the target device prior to the first data portion associated with said write operation being copied to said target device, copies said first data portion to said target device and performs said write operation;
    if a read operation is performed for another data portion of the target device prior to the another data portion associated with said read operation being copied to said target device, copies said another data portion to said target device and performs said read operation; and
    if a write operation is performed to a second data portion of the source device prior to the second data portion associated with said write operation being copied to said target device, copies said second data portion to said target device and performs said write operation to said source device.

12. The readable medium of claim 11, wherein said executable code that performs a copy operation, said executable code that copies said first data portion, said executable code that copies said another data portion, and said executable code that copies said second portion, update a migration bitmap having one or more entries in which each entry is associated with a portion of said target device.

13. The computer readable medium of claim 12, wherein each of said entries in said migration bitmap is associated with a track of data.

14. The computer readable medium of claim 13, wherein each of said entries has a value of 0 when a track of data associated with said each entry has been migrated, and a value of 1 otherwise.

15. The computer readable medium of claim 14, further comprising:
    executable code that initializes each entry in said migration bitmap to 1, and wherein each of said copy operation, said copying said first data portion, said copying said another data portion, and said copying said second portion modifying an entry in said migration bitmap to 0 after a corresponding track of data has been migrated from said source device to said target device.

16. The computer readable medium of claim 11, wherein a first host issues a data request to a first data storage system including said source device and a second host issues a data request to a second data storage system including said target device, said first data storage system being remote with respect to said second data storage system.

17. The computer readable medium of claim 16, wherein said copy operation is performed by executable code executing on either said first or said second data storage system in accordance with which of said data storage systems is controlling a data migration from said source device to said target device.

18. The computer readable medium of claim 16, further comprising:

executable code that updates one or more entries in a change bitmap associated with one of said source device or said target device indicating one or more modified portions of said one device in accordance with a request for performing a write operation for said one device.

19. The computer readable medium of claim 18, wherein each entry in said change bitmap is associated with a track of data on said one device, said each entry in said change bitmap have a value of 1 if a corresponding track of data on said one device has been modified and a value of zero otherwise.

20. The computer readable medium of claim 19, the computer readable medium further comprising:

executable code that performs an incremental backup of said source device to said target device using said change bitmap as a migration bitmap indicating which tracks of data to copy from said source device to said target device, wherein each track of said source device having a corresponding entry of 1 in said migration bitmap is copied from said source device to said target device.

* * * * *

UNITED STATES PATENT AND TRADEMARK OFFICE
CERTIFICATE OF CORRECTION

PATENT NO.        : 7,640,408 B1                                    Page 1 of 1
APPLICATION NO.   : 10/879383
DATED             : December 29, 2009
INVENTOR(S)       : Halligan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Ninth Day of November, 2010

David J. Kappos
*Director of the United States Patent and Trademark Office*